United States Patent
Sano

(10) Patent No.: US 8,192,875 B2
(45) Date of Patent: Jun. 5, 2012

(54) METHOD OF MANUFACTURING LITHIUM-ION SECONDARY BATTERY, ELECTROLYTIC SOLUTION, AND LITHIUM-ION SECONDARY BATTERY

(75) Inventor: Atsushi Sano, Tokyo (JP)

(73) Assignee: TDK Corporation, Tokyo (JP)

( * ) Notice: Subject to any disclaimer, the term of this patent is extended or adjusted under 35 U.S.C. 154(b) by 582 days.

(21) Appl. No.: 12/358,024

(22) Filed: Jan. 22, 2009

(65) Prior Publication Data

US 2009/0191457 A1 Jul. 30, 2009

(30) Foreign Application Priority Data

Jan. 30, 2008 (JP) .............................. P2008-019337
Dec. 4, 2008 (JP) .............................. P2008-309801

(51) Int. Cl.
*H01M 6/16* (2006.01)
(52) U.S. Cl. ........ 429/341; 429/188; 429/329; 429/163; 29/623.1
(58) Field of Classification Search ................. 429/341, 429/188, 329, 163; 29/623.1
See application file for complete search history.

(56) References Cited

FOREIGN PATENT DOCUMENTS

| JP | A 9-45328 | 2/1997 |
|---|---|---|
| JP | A 11-265710 | 9/1999 |
| JP | A 2000-123868 | 4/2000 |
| JP | A 2001-297794 | 10/2001 |
| JP | 2007-012468 | * 1/2007 |

OTHER PUBLICATIONS

JP 2007-012468 (Miyake et al.), translation and abstract, 2007.*

* cited by examiner

*Primary Examiner* — Laura Weiner
(74) *Attorney, Agent, or Firm* — Oliff & Berridge, PLC

(57) ABSTRACT

A method of manufacturing a lithium-ion secondary battery includes an electrolytic solution making step of making an electrolytic solution by mixing at least an organic solvent and an electrolytic salt together, an electrode insertion step of inserting an anode and a cathode into an outer case, and a liquid injection step of injecting the electrolytic solution into the outer case; wherein the electrolytic solution making step or the liquid injection step adds a compound having an alkyl group with a carbon number of 10 or greater and an epoxy, vinyl, or silanol group at a terminal to the electrolytic solution.

9 Claims, 13 Drawing Sheets

US 8,192,875 B2

METHOD OF MANUFACTURING LITHIUM-ION SECONDARY BATTERY, ELECTROLYTIC SOLUTION, AND LITHIUM-ION SECONDARY BATTERY

BACKGROUND OF THE INVENTION

1. Field of the Invention

The present invention relates to a method of manufacturing a lithium-ion secondary battery, an electrolytic solution, and a lithium-ion secondary battery.

2. Related Background Art

Lithium-ion secondary batteries have a problem that their electrolytic solutions are likely to decompose at the time of initial charging, thereby yielding an irreversible capacity. The decomposition of electrolytic solutions is problematic in that it causes gases, while decreasing the discharged capacity.

For coping with such a problem, a technique has been under consideration, which adds an additive to an electrolytic solution, so as to restrain the electrolytic solution from decomposing, thereby enhancing the initial charge/discharge efficiency and reducing the amount of gases generated.

Known as examples of the above-mentioned additive are polyethylene oxide, vinylene carbonate, and propane sultone (see, for example, Japanese Patent Application Laid-Open Nos. 11-265710, 09-45328, 2001-297794, and 2000-123868). These additives are reductively decomposed at the negative electrode, so as to form a coating film, which restrains the electrolytic solution from decomposing.

SUMMARY OF THE INVENTION

However, techniques which form a coating film on the negative electrode surface with an additive, such as those described in Japanese Patent Application Laid-Open Nos. 11-265710, 09-45328, 2001-297794, and 2000-123868 are problematic in that thus formed coating film becomes a resistance at the time of charging/discharging, so as to raise the internal resistance of the battery, thereby lowering the rate characteristic.

In view of the above-mentioned problems of the prior art, it is an object of the present invention to provide a method of manufacturing a lithium-ion secondary battery which produces a lithium-ion secondary battery capable of achieving both the initial charge/discharge efficiency and rate characteristic at a high level, an electrolytic solution, and a lithium-ion secondary battery.

For achieving the above-mentioned object, in one aspect, the present invention provides a method of manufacturing a lithium-ion secondary battery, the method including an electrolytic solution making step of making an electrolytic solution by mixing at least an organic solvent and an electrolytic salt together, an electrode insertion step of inserting an anode and a cathode into an outer case, and a liquid injection step of injecting the electrolytic solution into the outer case; wherein the electrolytic solution making step or the liquid injection step adds a compound having an alkyl group with a carbon number of 10 or greater and an epoxy, vinyl, or silanol group at a terminal to the electrolytic solution.

By adding a compound having an alkyl group with a carbon number of 10 or greater and an epoxy, vinyl, or silanol group at a terminal into the electrolytic solution, the above-mentioned method can yield a lithium-ion secondary battery capable of achieving both the initial charge/discharge efficiency and rate characteristic at a high level.

When a compound having an alkyl group with a carbon number of about 1 or 2 and an epoxy, vinyl, or silanol group is added to an electrolytic solution, for example, the alkyl group polymerizes at the time of charging, thereby forming a coating film on the anode surface. Though thus forming a coating film by polymerizing the alkyl group restrains the electrolytic solution from decomposing, the formed coating film becomes a resistance at the time of charging/discharging, thereby increasing the internal resistance of the battery and lowering the rate characteristic.

When a compound having an alkyl group with a carbon number of 10 or greater and an epoxy, vinyl, or silanol group is added to an electrolytic solution, on the other hand, the alkyl group does not polymerize at the time of charging, whereby the compound is supported or adsorbed onto the anode surface or combined thereon through the epoxy, vinyl, or silanol group. In this case, the alkyl group part yields such a degree of freedom as to pass ions moderately therethrough, whereby the internal resistance of the battery is kept from rising. Also, the existence of the above-mentioned compound can restrain coating films and the like, which may raise the internal resistance, from being formed on the anode surface, thereby yielding a rate characteristic better than that obtained without adding the above-mentioned compound to the electrolytic solution. Though the reason why the rate characteristic is improved by adding the above-mentioned compound has not been elucidated completely, it is presumed that the above-mentioned compound covers the anode surface by being supported, adsorbed, or combined thereon, so that an alkyl chain, which is a part of the compound, shapes a flow of lithium ions, thereby allowing the lithium ions to move smoothly. The support, adsorption, or combination of the above-mentioned compound onto the anode surface occurs at active sites of the anode surface selectively and in preference to the decomposition of the electrolytic solution. Since the decomposition of the electrolytic solution occurs at the active sites of the anode surface, the above-mentioned compound supported, adsorbed, or combined at the active sites restrains the decomposition of the electrolytic solution from proceeding. Therefore, adding the above-mentioned compound to the electrolytic solution can keep the irreversible capacity from being generated by the decomposition of the electrolytic solution, whereby a favorable initial charge/discharge efficiency can be obtained.

In this specification, the "anode" and "cathode" are determined with reference to the polarities of the lithium-ion secondary battery at the time of discharging for convenience of explanation. Hence, the "anode" and "cathode" become the "cathode" and "anode", respectively, at the time of charging.

Preferably, in the method of manufacturing a lithium-ion secondary battery in accordance with the present invention, the above-mentioned compound is represented by the following general formula (1):

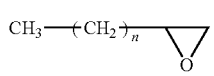
(1)

where n is an integer of 9 to 17.

Using the compound represented by the above-mentioned general formula (1) can more effectively exhibit the effects mentioned above, thereby yielding a lithium-ion secondary battery which can achieve both the initial charge/discharge efficiency and rate characteristic at a high level.

Preferably, in the method of manufacturing a lithium-ion secondary battery in accordance with the present invention, the above-mentioned compound is added by 0.3 to 3.0 mass % with respect to the total amount of the electrolytic solution after adding the compound. When the amount of addition of the compound falls within the range mentioned above, the above-mentioned effects are exhibited more effectively, thus making it possible to yield a lithium-ion secondary battery which can achieve both the initial charge/discharge efficiency and rate characteristic at a high level.

Preferably, in the method of manufacturing a lithium-ion secondary battery in accordance with the present invention, the anode contains at least one of graphite, an Si-containing compound, and an Sn-containing compound as an active material. Using the anode containing such an active material can more effectively exhibit the effects mentioned above, thereby yielding a lithium-ion secondary battery which can achieve both the initial charge/discharge efficiency and rate characteristic at a high level.

In another aspect, the present invention provides an electrolytic solution containing an organic solvent, an electrolytic salt, and a compound having an alkyl group with a carbon number of 10 or greater and an epoxy, vinyl, or silanol group at a terminal.

Since this electrolytic solution contains a compound having an alkyl group with a carbon number of 10 or greater and an epoxy, vinyl, or silanol group at a terminal, it can achieve both the initial charge/discharge efficiency and rate characteristic at a high level, because of the reason explained in connection with the above-mentioned method of manufacturing a lithium-ion secondary battery, when used as the electrolytic solution of the lithium-ion secondary battery.

Preferably, in the electrolytic solution in accordance with the present invention, the above-mentioned compound is represented by the following general formula (1):

where n is an integer of 9 to 17.

Using the compound represented by the above-mentioned general formula (1) can more effectively exhibit the effects mentioned above when a lithium-ion secondary battery is constructed, whereby both the initial charge/discharge efficiency and rate characteristic can be achieved at a high level.

Preferably, in the electrolytic solution in accordance with the present invention, the above-mentioned compound is contained by 0.3 to 3.0 mass % with respect to the total amount of the electrolytic solution. The content of the compound falling within the range mentioned above can exhibit the above-mentioned effects more effectively when a lithium-ion secondary battery is constructed, whereby both the initial charge/discharge efficiency and rate characteristic can be achieved at a high level.

In still another aspect, the present invention provides a lithium-ion secondary battery comprising an anode, a cathode, and an electrolytic solution, wherein the electrolytic solution is the above-mentioned electrolytic solution in accordance with the present invention.

Since this lithium-ion secondary battery uses the above-mentioned electrolytic solution in accordance with the present invention, it can achieve both the initial charge/discharge efficiency and rate characteristic at a high level, because of the reason explained in connection with the above-mentioned method of manufacturing a lithium-ion secondary battery.

Preferably, in the lithium-ion secondary battery in accordance with the present invention, the anode contains at least one of graphite, an Si-containing compound, and an Sn-containing compound as an active material. Using the anode containing such an active material can more effectively exhibit the effects mentioned above, whereby both the initial charge/discharge efficiency and rate characteristic can be achieved at a high level.

In still another aspect, the present invention provides a lithium-ion secondary battery manufactured by the above-mentioned method of manufacturing a lithium-ion secondary battery in accordance with the present invention.

This lithium-ion secondary battery can achieve both the initial charge/discharge efficiency and rate characteristic at a high level, because of the reason explained in connection with the above-mentioned method of manufacturing a lithium-ion secondary battery.

As in the foregoing, the present invention can provide a method of manufacturing a lithium-ion secondary battery for producing a lithium-ion secondary battery capable of achieving both the initial charge/discharge efficiency and rate characteristic at a high level, an electrolytic solution, and a lithium-ion secondary battery.

DESCRIPTION OF THE PREFERRED EMBODIMENTS

Figure 1:
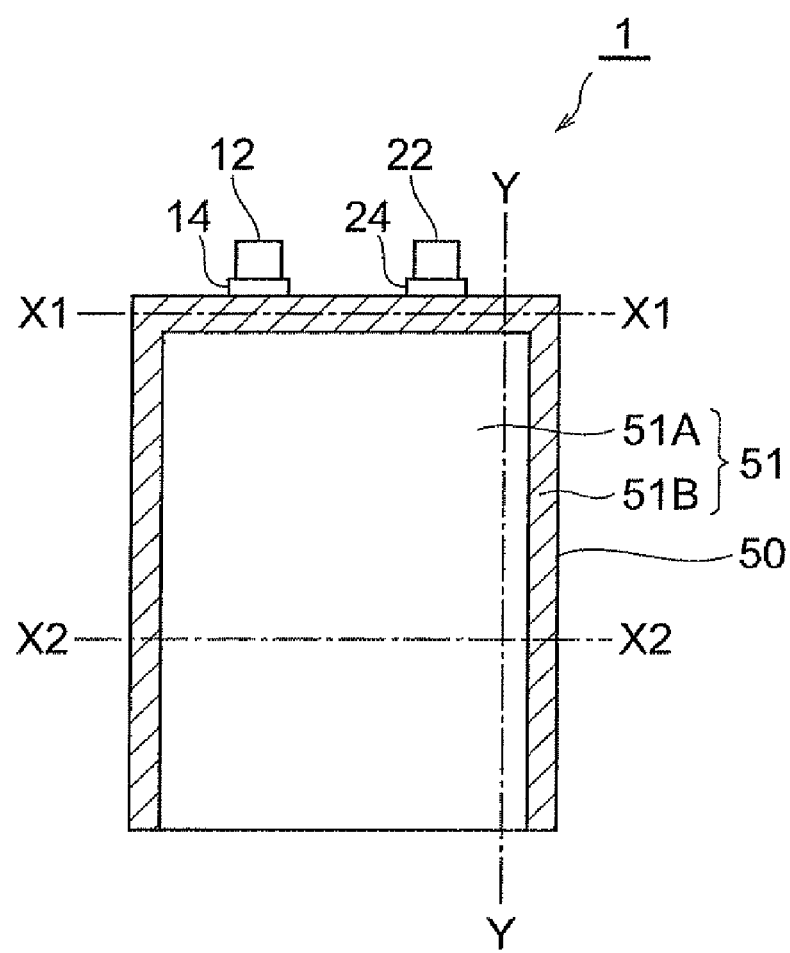
FIG. 1 is a front view showing a preferred embodiment of the lithium-ion secondary battery in accordance with the present invention.

In the following, preferred embodiments of the present invention will be explained in detail with reference to the drawings. In the drawings, identical or equivalent parts will be referred to with the same numerals while omitting their overlapping explanations. Positional relationships such as upper/lower and left/right are based on those shown in the drawings unless otherwise specified. Ratios of dimensions in the drawings are not limited to those depicted.

Figure 2:
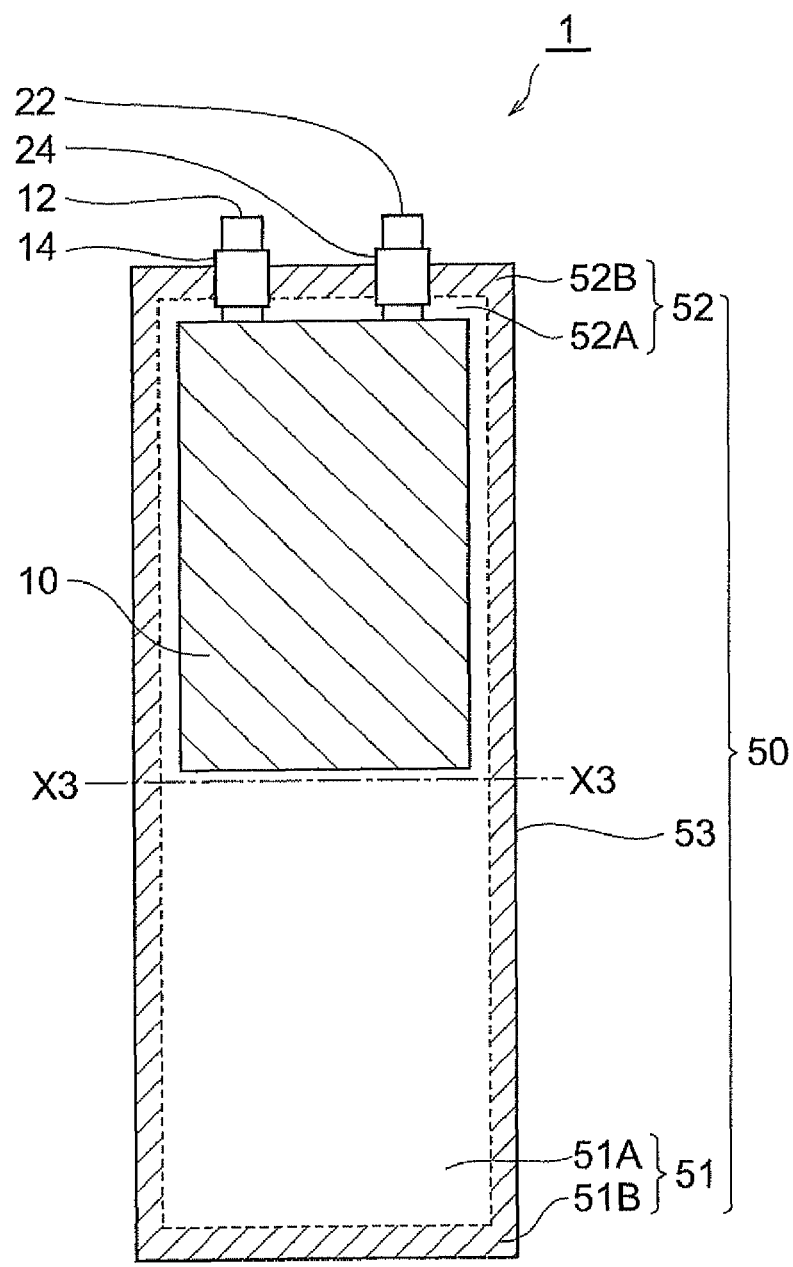
FIG. 2 is an unfolded view of the inside of the lithium-ion secondary battery shown in FIG. 1 as seen in a direction normal to the surface of an anode 10.
Figure 3:
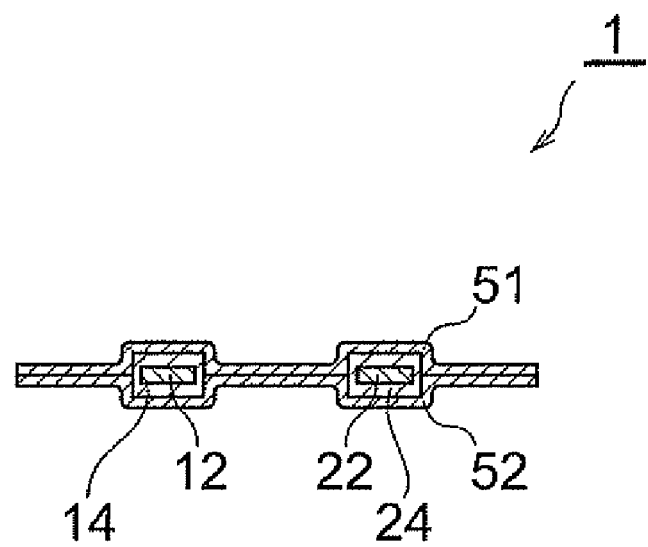
FIG. 3 is a schematic sectional view of the lithium-ion secondary battery taken along the line X1-X1 of FIG. 1.
Figure 4:
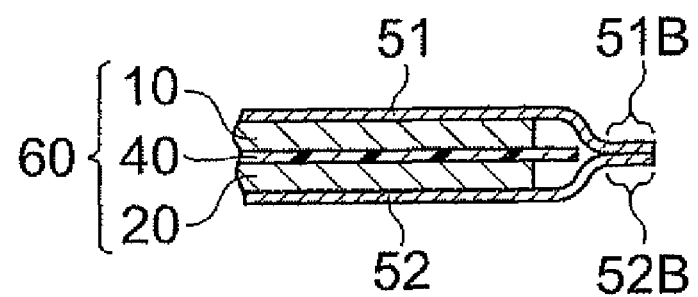
FIG. 4 is a schematic sectional view showing a main part of the lithium-ion secondary battery taken along the line X2-X2 of FIG. 1.
Figure 5:
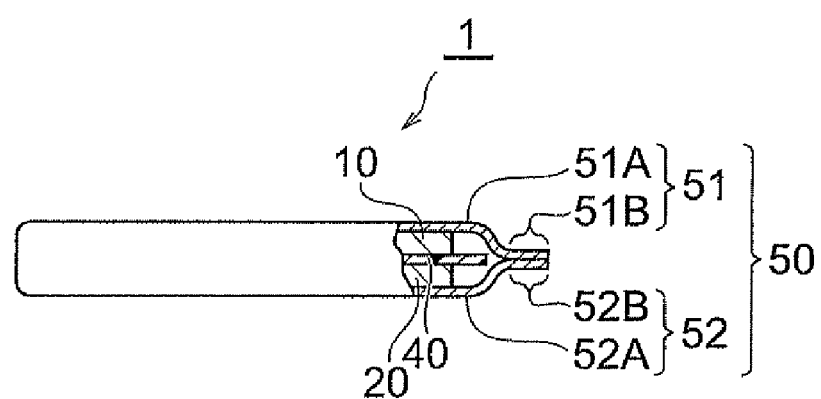
FIG. 5 is a schematic sectional view showing a main part of the lithium-ion secondary battery taken along the line Y-Y of FIG. 1.

FIG. 1 is a front view showing a preferred embodiment of the lithium-ion secondary battery in accordance with the present invention. FIG. 2 is an unfolded view of the inside of the lithium-ion secondary battery shown in FIG. 1 as seen in a direction normal to the surface of an anode 10. FIG. 3 is a schematic sectional view of the lithium-ion secondary battery taken along the line X1-X1 of FIG. 1. FIG. 4 is a schematic sectional view showing a main part of the lithium-ion secondary battery taken along the line X2-X2 of FIG. 1. FIG. 5 is a schematic sectional view showing a main part of the lithium-ion secondary battery taken along the line Y-Y of FIG. 1.

As shown in FIGS. 1 to 5, the lithium-ion secondary battery 1 is mainly constituted by a planar anode 10 and a planar cathode 20 which oppose each other, a planar separator 40 which is arranged between and adjacent to the anode 10 and cathode 20, an electrolytic solution containing lithium ions, a case (outer case) 50 containing them in a sealed state, an anode lead 12 having one end part electrically connected to the anode 10 and the other end part projecting out of the case 50, and a cathode lead 22 having one end part electrically connected to the cathode 20 and the other end part projecting out of the case 50. The electrolytic solution contains a compound having an alkyl group with a carbon number of 10 or greater and an epoxy, vinyl, or silanol group at a terminal.

Constituents in this embodiment will now be explained in detail with reference to FIGS. 1 to 9.

Figure 8:
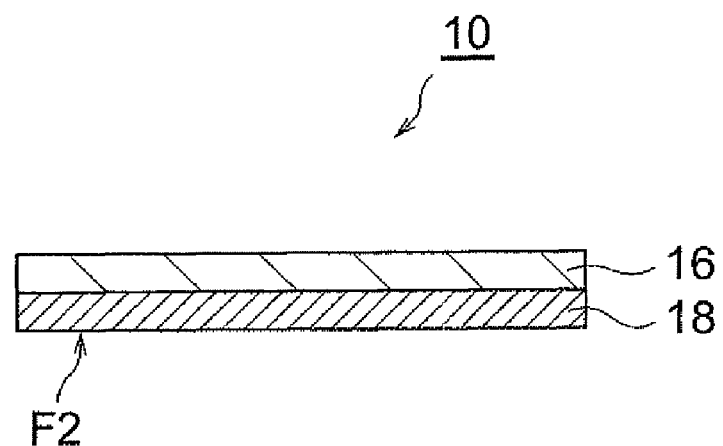
FIG. 8 is a schematic sectional view showing an example of a basic structure of an anode of the lithium-ion secondary battery shown in FIG. 1.
Figure 9:
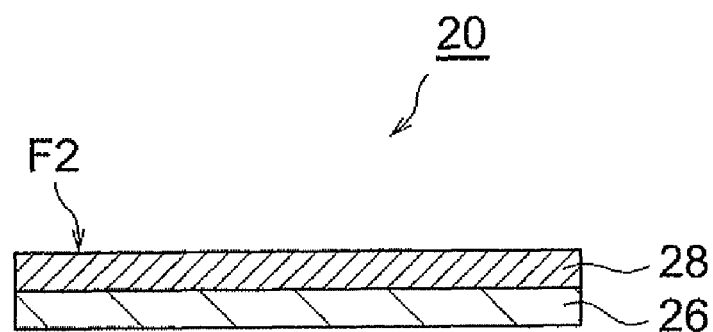
FIG. 9 is a schematic sectional view showing an example of a basic structure of a cathode of the lithium-ion secondary battery shown in FIG. 1.

First, the anode 10 and cathode 20 will be explained. FIG. 8 is a schematic sectional view showing an example of a basic structure of the anode 10 of the lithium-ion secondary battery 1 shown in FIG. 1. FIG. 9 is a schematic sectional view showing an example of a basic structure of the cathode 20 of the lithium-ion secondary battery 1 shown in FIG. 1.

As shown in FIG. 8, the anode 10 is constituted by a current collector 16 and an anode active material containing layer 18 formed on the current collector 16. As shown in FIG. 9, the cathode 20 is constituted by a current collector 26 and a cathode active material containing layer 28 formed on the current collector 26.

The current collectors 16 and 26 are not limited in particular as long as they are good conductors which can sufficiently move electric charges to the anode active material containing layer 18 and cathode active material containing layer 28; current collectors employed in known lithium-ion secondary batteries can be used therefor. Examples of the current collectors 16 and 26 include metal foils made of copper and aluminum, respectively.

The anode active material containing layer 18 of the anode 10 is mainly composed of an anode active material and a binder. Preferably, the anode active material containing layer 18 further contains a conductive auxiliary agent.

The anode active material is not limited in particular as long as it allows occlusion and release of lithium ions, desorption and intercalation of lithium ions, or doping and undoping of lithium ions and their counter anions (e.g., $PF_6^-$ and $ClO_4^-$) to proceed reversibly; known anode active materials can be used therefor. Examples of the active material include carbon materials such as natural graphite, synthetic graphite, non-graphitizing carbon, graphitizable carbon, and low-temperature-firable carbon; metals such as Al, Si, and Sn which are combinable with lithium; amorphous compounds mainly composed of oxides such as SiO, $SiO_2$, $SiO_x$, and $SnO_2$; lithium titanate ($Li_4Ti_5O_{12}$); and $TiO_2$. Preferred among them are carbon materials. More preferred are carbon materials having an interlayer distance $d_{002}$ of 0.335 to 0.338 nm and a crystallite size $Lc_{002}$ of 30 to 120 nm. Examples of carbon materials that satisfy such a condition include synthetic graphite, MCF (mesocarbon fiber), and MCMB (mesocarbon microbeads). The above-mentioned interlayer distance $d_{002}$ and crystallite size $Lc_{002}$ can be determined by X-ray diffraction.

As the binder, known binders can be used without any limitations in particular. Examples of the binder include fluororesins such as polyvinylidene fluoride (PVDF), polytetrafluoroethylene (PTFE), tetrafluoroethylene/hexafluoropropylene copolymers (FEP), tetrafluoroethylene/perfluoroalkylvinyl ether copolymers (PFA), ethylene/tetrafluoroethylene copolymers (ETFE), polychlorotrifluoroethylene (PCTFE), ethylene/chlorotrifluoroethylene copolymers (ECTFE), and polyvinyl fluoride (PVF). The binder not only binds constituent materials of active material particles and conductive auxiliary agents and the like, which are added when necessary, to each other, but also contributes to binding these constituent materials to the current collectors.

Other examples of the binder include fluorine rubbers based on vinylidene fluoride such as fluorine rubbers based on vinylidene fluoride/hexafluoropropylene (VDF/HFP-based fluorine rubbers).

Still other examples of the binder include polyethylene, polypropylene, polyethylene terephthalate, aromatic polyamides, celluloses, styrene/butadiene rubbers, isoprene rubbers, butadiene rubbers, and ethylene/propylene rubbers. Also usable are thermoplastic elastomeric polymers such as styrene/butadiene/styrene block copolymers and their hydrogen adducts, styrene/ethylene/butadiene/styrene copolymers, and styrene/isoprene/styrene block copolymers and their hydrogen adducts. Further, syndiotactic 1,2-polybutadiene, ethylene/vinyl acetate copolymers, propylene/α-olefin (having a carbon number of 2 to 12) copolymers, and the like may be used. Conductive polymers may also be used.

As for the conductive auxiliary agent used when necessary, known conductive auxiliary agents can be used without any restrictions in particular. Examples of the conductive auxiliary agent include carbon blacks, carbon materials, powders of metals such as copper, nickel, stainless steel, and iron, mixtures of carbon materials and powders of metals, and conductive oxides such as ITO.

The content of the anode active material in the anode active material containing layer 18 is preferably 80 to 97 mass %, more preferably 85 to 96 mass %, with respect to the total amount of the active material containing layer 18. The energy density tends to become lower when the active material content is less than 80 mass % than when the content falls within the range mentioned above, whereas the adhesion force and cycle characteristic tend to become inferior when the active material content exceeds 97 mass % than when the content falls within the range mentioned above.

The cathode active material containing layer 28 of the cathode 20 is mainly composed of a cathode active material and a binder. Preferably, the cathode active material containing layer 28 further contains a conductive auxiliary agent.

The cathode active material is not limited in particular as long as it allows occlusion and release of lithium ions, desorption and intercalation of lithium ions, or doping and undoping of lithium ions and their counter anions (such as $ClO_4^-$) to proceed reversibly; known electrode active materials can be used therefor. Examples of the cathode active material include lithium cobaltate ($LiCoO_2$), lithium nickelate ($LiNiO_2$), lithium manganese spinel ($LiMn_2O_4$), and mixed metal oxides such as those expressed by the general formula of $LiNi_xCo_yMn_zM_aO_2$ (where $x+y+z+a=1$, $0 \leq x \leq 1$, $0 \leq y \leq 1$, $0 \leq z \leq 1$, $0 \leq a \leq 1$, and M is at least one kind of element selected from Al, Mg, Nb, Ti, Cu, Zn, and Cr), a lithium vanadium compound ($LiV_2O_5$), olivine-type $LiMPO_4$ (where M is at least one kind of element selected from Co, Ni, Mn, Fe, Mg, Nb, Ti, Al, and Zr, or VO), and lithium titanate ($Li_4Ti_5O_{12}$).

The binder used in the cathode 20 may be one similar to that employed in the anode 10. The conductive auxiliary agent used in the cathode 20 when necessary may be one similar to that employed in the anode 10.

The current collector 28 of the cathode 20 is electrically connected to one end of a cathode lead 22 made of aluminum, for example, while the other end of the cathode lead 22 extends to the outside of the case 50. On the other hand, the current collector 16 of the anode 10 is electrically connected to one end of an anode lead 12 made of copper or nickel, for example, while the other end of the anode lead 12 extends to the outside of the case 50.

The separator 40 arranged between the anode 10 and cathode 20 is not limited in particular as long as it is formed from a porous body exhibiting ion permeability and electronic insulation; separators used in known lithium-ion secondary batteries can be employed therefor. Examples of the separator include multilayer films made of polyethylene, polypropylene, or a polyolefin, drawn films of mixtures of the polymers mentioned above, and fiber nonwoven cloth composed of at least one kind of constituent material selected from the group consisting of cellulose, polyester, and polypropylene.

The electrolytic solution (not depicted) fills the inner space of the case 50, while being partly contained within the anode 10, cathode 20, and separator 40. Employed as the electrolytic solution is a nonaqueous electrolytic solution in which a lithium salt as an electrolytic salt is dissolved in an organic solvent. A compound (which will be referred to as "additive compound" as the case may be) having an alkyl group with a carbon number of 10 or greater and an epoxy, vinyl, or silanol group at a terminal is added into the electrolytic solution.

In the additive compound, the alkyl group may be either linear or branched. Examples of the alkyl group include linear or branched decyl group, linear or branched undecyl group, linear or branched dodecyl group, linear or branched tridecyl group, linear or branched tetradecyl group, linear or branched pentadecyl group, linear or branched hexadecyl group, linear or branched heptadecyl group, linear or branched octadecyl group, linear or branched nonadecyl group, linear or branched icosyl group, linear or branched henicosyl group, linear or branched docosyl group, linear or branched tricosyl group, linear or branched tetracosyl group, linear or branched pentacosyl group, linear or branched hexacosyl group, linear or branched heptacosyl group, linear or branched octacosyl group, linear or branched nonacosyl group, linear or branched triacorityl group, linear or branched hentriacontyl group, linear or branched dotriacontyl group, linear or branched tritriacontyl group, linear or branched tetratriacontyl group, linear or branched pentatriacontyl group, linear or branched hexatriacontyl group, linear or branched heptatriacontyl group, linear or branched octatriacontyl group, linear or branched nonatriacontyl group, and linear or branched tetracontyl group, Preferred among them as the alkyl group from the viewpoint of attaining the effects of the present invention more effectively are linear ones.

The carbon number of the alkyl group is needed to be 10 or greater and is preferably 10 to 20, more preferably 10 to 18, further preferably 10 to 15, particularly preferably 10 to 13, from the viewpoint of attaining the effects of the present invention more effectively.

From the viewpoint of attaining the effects of the present invention more effectively, the additive compound is preferably a compound having an epoxy group at a terminal, particularly preferably a compound represented by the following general formula (1):

(1)

In the general formula (1), n is an integer of 9 to 17, preferably 9 to 14, particularly preferably 9 to 12.

The above-mentioned additive compounds may be used singly or in combinations of two or more.

The content of the additive compound is preferably 0.1 to 7.0 mass %, more preferably 0.1 to 5.0 mass %, further preferably 0.3 to 3.0 mass %, particularly preferably 0.5 to 3.0 mass %, most preferably 1.0 to 3.0 mass %, with respect to the total amount of the electrolytic solution. The effect of adding the additive compound tends to become less sufficient when the content is less than 0.1 mass % than when the content falls within the range mentioned above, whereas the cycle characteristic tends to become lower when the content exceeds 7.0 mass % than when the content falls within the above-mentioned range. The initial charge/discharge efficiency, rate characteristic, and cycle characteristic become particularly excellent when the content of the additive compound falls within the range of 0.3 to 3.0 mass %.

Examples of the lithium salt include $LiPF_6$, $LiClO_4$, $LiBF_4$, $LiAsF_6$, $LiCF_3SO_3$, $LiCF_3CF_2SO_3$, $LiC(CF_3SO_2)_3$, $LiN(CF_3SO_2)_2$, $LiN(CF_3CF_2SO_2)_2$, $LiN(CF_3SO_2)(C_4F_9SO_2)$, $LiN(CF_3CF_2CO)_2$, and salts of boron-containing compounds such as LiBOB. They may be mixed with ionic liquids such as quaternary ammonium salts and imidazolium salts. These salts may be used singly or in combinations of two or more. The electrolytic solution may be gelled with a polymer or the like added thereto.

As the organic solvent, solvents employed in known electrochemical devices may be used. Preferred examples include propylene carbonate, ethylene carbonate, and diethyl carbonate. They may be used singly or in mixtures of two or more at any rates.

In the electrolytic solution, the additive compound may exist as it is or in a state supported, adsorbed, or combined on the active material surface of the anode 10. The additive compound usually exists as it is in the lithium-ion secondary battery before the initial charge. After the initial charge, at least a part of the additive compound exists in a state supported, adsorbed, or combined on the active material surface of the anode 10.

The case 50 is formed by using a pair of films (first film 51 and second film 52) opposing each other. Here, the first film 51 and the second film 52 are connected to each other as shown in FIG. 2. That is, the case 50 in this embodiment is formed by folding a rectangular film made of a single composite packaging film at a folding line X3-X3 shown in FIG. 2, overlaying a pair of opposing fringe parts (fringe part 51B of the first film 51 and fringe part 52B of the second film 52 in the drawing) of the rectangular film on each other, and bonding them to each other with an adhesive or by heat-sealing.

Here, 51A in FIGS. 1 and 2 and 52A in FIG. 2 indicate respective partial areas of the first film 51 and the second film 52 which are free of the adhesive or heat-sealing.

The first film 51 and the second film 52 represent respective parts of the single rectangular film having surfaces opposing each other formed when the film is folded as mentioned above. In this specification, the respective fringe parts of the first film 51 and the second film 52 after being bonded together will be referred to as "seal parts".

This makes it unnecessary to provide a seal part for bonding the first film 51 and the second film 52 to each other at the folding line X3-X3, whereby the seal parts in the case 50 can further be reduced. As a result, the volume energy density based on the volume of the space to place the lithium-ion secondary battery 1 can further be improved.

In this embodiment, as shown in FIGS. 1 and 2, the anode lead 12 connected to the anode 10 and cathode lead 22 connected to the cathode 20, respectively, are arranged such that their respective one ends project out of the seal part where the fringe part 51B of the first film 51, and the fringe part 52B of the second film 52 are bonded together.

As mentioned above, the film constructing the first film 51 and the second film 52 is a flexible film. The film is lightweight and easy to be made thin, whereby the lithium-ion secondary battery itself can be formed into a thin film. This can easily improve the original volume energy density and the volume energy density based on the volume of the space to place the lithium-ion secondary battery.

The film is not limited in particular as long as it is a flexible film, but is preferably a composite packaging film having at least an innermost layer made of a polymer in contact with a power generating element 60 and a metal layer arranged on the side opposite from the side of the innermost layer in contact with the power generating element from the viewpoint of effectively preventing moisture and air from entering the inside from the outside of the case 50 and electrolytic components from escaping from the inside to the outside of the case 50, while keeping a sufficient mechanical strength and lightweight of the case.

Figure 6:
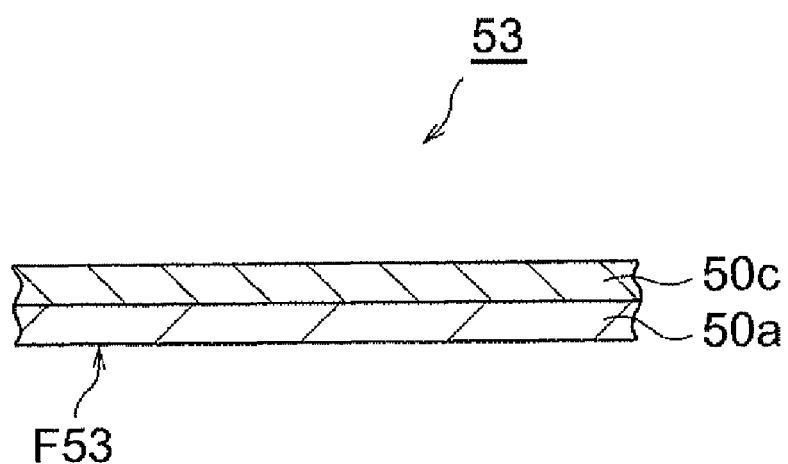
FIG. 6 is a schematic sectional view showing an example of a basic structure of a film to become a constituent material of a case of the lithium-ion secondary battery shown in FIG. 1.
Figure 7:
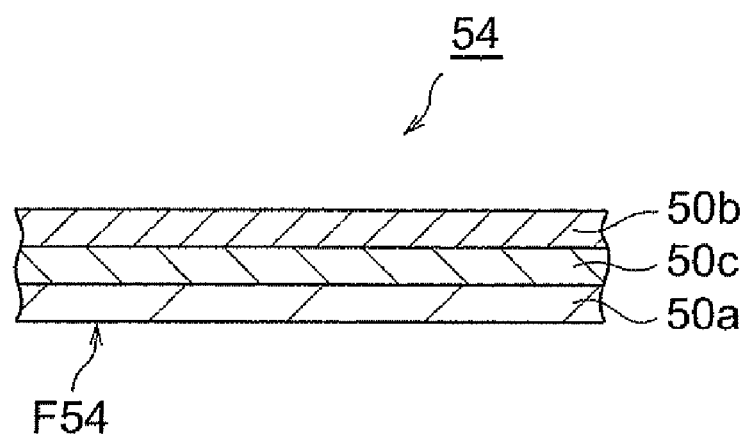
FIG. 7 is a schematic sectional view showing another example of the basic structure of the film to become the constituent material of the case of the lithium-ion secondary battery shown in FIG. 1.

Examples of composite packaging films usable as the first film 51 and the second film 52 include those having the structures shown in FIGS. 6 and 7. The composite packaging film 53 shown in FIG. 6 has an innermost layer 50a made of a polymer in contact with the power generating element 60 at its inner face F53, and a metal film 50c arranged on the other face (outer face) of the innermost layer 50a. The composite packaging film 54 shown in FIG. 7 has a structure in which an outermost layer 50b made of a polymer is further arranged on the outer face of the metal layer 50c of the composite packaging film 53 shown in FIG. 6.

The composite packaging film usable as the first film 51 and the second film 52 is not limited in particular as long as it is a composite packaging material having at least two layers composed of at least one polymer layer including the above-mentioned innermost layer and a metal layer such as a metal foil layer, but is more preferably constructed by at least three layers having an innermost layer 50a, an outermost layer 50b made of a polymer arranged on the outer face side of the case 50 farthest from the innermost layer 50a, and at least one metal layer 50c arranged between the innermost layer 50a and outermost layer 50b as in the composite packaging film 54 shown in FIG. 7 from the viewpoint of more reliably attaining effects similar to those mentioned above.

The innermost layer 50a is a layer with flexibility, whose constituent material is not limited in particular as long as it is a polymer which can exhibit the flexibility while having chemical stability (properties of causing none of chemical reaction, dissolution, and swelling) against the nonaqueous electrolytic solution used, and chemical stability against oxygen and water (moisture in the air). Preferably, the material is one further exhibiting a low permeability to oxygen, water (moisture in the air), and the ingredients of the nonaqueous electrolytic solution. Examples of the material include engineering plastics and thermoplastic resins such as polyethylene, polypropylene, acid-modified polyethylene, acid-modified polypropylene, polyethylene ionomers, and polypropylene ionomers.

The "engineering plastics" refer to plastics having such excellent mechanical characteristics, heat resistance, and durability as to be used in mechanical parts, electrical parts, housing materials, and the like. Examples of the engineering plastics include polyacetals, polyamides, polycarbonates, polyoxytetramethylene oxyterephthaloyl (polybutylene terephthalate), polyethylene terephthalate, polyimides, and polyphenylene sulfide.

When a layer made of a polymer such as the outermost layer 50b is further provided in addition to the innermost layer 50a as in the composite packaging film 54 shown in FIG. 7, this polymer layer may use a constituent material similar to that of the innermost layer 50a.

Preferably, the metal layer 50c is a layer made of a metal material having an anticorrosion property against oxygen, water (moisture in the air), and the nonaqueous electrolytic solution. For example, metal foils made of aluminum, aluminum alloys, titanium, chromium, and the like may be used.

Though not restricted in particular, the method of sealing all the seal parts in the case 50 is preferably a heat-sealing method from the viewpoint of productivity.

As shown in FIGS. 1 and 2, the part of the anode lead 12 coming into contact with the seal part of the outer bag constituted by the fringe part 51B of the first film 51 and the fringe part 52B of the second film 52 is covered with an insulator 14 for preventing the anode lead 12 and the metal layer in the composite packaging film constituting the individual films from coming into contact with each other The part of the cathode lead 22 coming into contact with the seal part of the outer bag constituted by the fringe part 51B of the first film 51 and the fringe part 52B of the second film 52 is covered with an insulator 24 for preventing the cathode lead 22 and the metal layer in the composite packaging film constituting the individual films from coming into contact with each other.

Though the structures of the insulator 14 and the insulator 24 are not limited in particular, they may be formed from polymers, for example. When the metal layer in the composite packaging film can sufficiently be prevented from coming into contact with the anode lead 12 and cathode lead 22, the insulator 14 and the insulator 24 may be omitted.

The method of manufacturing a lithium-ion secondary battery for making the above-mentioned lithium-ion secondary battery 1 in accordance with the present invention will now be explained.

The method of manufacturing a lithium-ion secondary battery in accordance with the present invention is a method of manufacturing the lithium-ion secondary battery 1 having the structure mentioned above, the method including an electrolytic solution making step of making an electrolytic solution by mixing at least an organic solvent and an electrolytic salt together, an electrode insertion step of inserting the anode 10 and cathode 20 into the case (outer case) 50, and a liquid injection step of injecting the electrolytic solution into the case 50; wherein the electrolytic solution making step or the liquid injection step adds a compound having an alkyl group with a carbon number of 10 or greater and an epoxy, vinyl, or silanol group at a terminal to the electrolytic solution.

In the electrolytic solution making step, the electrolytic solution is prepared by mixing the organic solvent and the lithium salt as the electrolytic salt, which are explained above. The compound (additive compound explained above) having an alkyl group with a carbon number of 10 or greater and an epoxy, vinyl, or silanol group at a terminal may be added here to prepare the electrolytic solution, or added in the liquid injection step of injecting the electrolytic solution into the case 50.

In either case, the amount of the additive compound is preferably 0.1 to 7.0 mass %, more preferably 0.1 to 5.0 mass %, further preferably 0.3 to 3.0 mass %, particularly preferably 0.5 to 3.0 mass %, most preferably 1.0 to 3.0 mass %, with respect to the total amount of the electrolytic solution after adding the additive compound thereto. The effect of adding the additive compound tends to become less sufficient when the amount is less than 0.1 mass % than when the amount falls within the range mentioned above, whereas the cycle characteristic tends to become lower when the amount exceeds 7.0 mass % than when the amount falls within the above-mentioned range. The initial charge/discharge efficiency, rate characteristic, and cycle characteristic become particularly excellent when the amount of the additive compound falls within the range of 0.3 to 3.0 mass %.

The method of manufacturing the power generating element 60 (the multilayer body in which the anode 10, separator 40, and cathode 20 are laminated in this order) is not limited in particular; any of known methods employed for manufacturing known lithium-ion secondary batteries can be used.

First, when making the anode 10 and cathode 20, the constituent ingredients mentioned above are mixed and then dispersed in a solvent which can dissolve the binder, so as to prepare an electrode forming coating liquid (slurry, paste, or the like). The solvent is not limited in particular as long as the binder can be dissolved therein. For example, N-methyl-2-pyrrolidone or N,N-dimethylformamide can be used as the solvent.

Next, the electrode forming coating liquid is applied to the respective surfaces of the current collectors and dried and extended thereon, so as to form the active material containing layers on the current collectors, thereby completing the making of the anode 10 and cathode 20. The technique for applying the electrode forming coating liquid onto the surfaces of the current collectors is not restricted in particular, and may be determined appropriately according to the material, form, and the like of the current collectors. Examples of the coating method include metal mask printing, electrostatic coating, dip coating, spray coating, roll coating, doctor blading, gravure coating, and screen printing.

Thereafter, the anode lead 12 and cathode lead 22 are electrically connected to thus made anode 10 and cathode 20, respectively.

Next, the separator 40 is arranged between the anode 10 and cathode 20 in contact therewith (preferably in a nonbonding state), so as to complete the power generating element 60. Here, the surface F2 of the anode 10 facing the anode active material containing layer 18 and the surface F2 of the cathode 20 facing the cathode active material containing layer 28 are arranged such as to come into contact with the separator 40.

An example of the method of making the case 50 will now be explained. First, when constructing the first and second films from the above-mentioned composite packaging film, a known method such as dry lamination, wet lamination, hot-melt lamination, or extrusion lamination is used.

For example, a film to become a layer made of a polymer and a metal foil made of aluminum which constitute the composite packaging film are prepared. The metal foil can be prepared by extending a metal material, for example.

Next, the metal foil is bonded onto the film to become a layer made of a polymer with an adhesive, and so forth, so as to yield a structure preferably composed of the above-mentioned plurality of layers, thereby making the composite packaging film (multilayer film). Then, the composite packaging film is cut into a predetermined size, so as to prepare a single rectangular film.

Subsequently, as previously explained with reference to FIG. 27 the single film is folded, and the seal part 51B (fringe part 51B) of the first film 51 and the seal part 52B (fringe part 52B) of the second film 52 are heat-sealed by a desirable seal width with a sealer under a predetermined heating condition, for example. Here, for securing an opening for introducing the power generating element 60 into the case 50, a part is left without being heat-sealed. This yields the case 50 with an opening.

Then, the power generating element 60 having the anode lead 12 and cathode lead 22 electrically connected thereto is inserted into the case 50 having the opening (electrode insertion step).

Next, the above-mentioned electrolytic solution is injected into the case 50 having the opening (liquid injection step). The additive compound is added to the electrolytic solution in this step if not added in the above-mentioned electrolytic solution making step.

Subsequently, while the anode lead 12 and cathode lead 22 are partly inserted in the case 50, the opening of the case 50 is sealed with a sealer. This completes the making of the case 50 and lithium-ion secondary battery 1. The lithium-ion secondary battery of the present invention is not limited to one having the form shown in FIG. 1, but may have a cylindrical form, for example.

When thus obtained lithium-ion secondary battery is initially charged, the additive compound in the electrolytic solution is preferentially supported, adsorbed, or combined at active points on the active material surface of the anode 10, so as to restrain the electrolytic solution from decomposing, thereby making it possible to yield a favorable initial charge/discharge efficiency, and keep the internal resistance from rising, thereby making it possible to attain a favorable rate characteristic. In the lithium-ion secondary battery after the initial charge, the additive compound is supported, adsorbed, or combined at the active points on the active material surface of the anode 10, so that the electrolytic solution is sufficiently restrained from decomposing while the internal resistance is kept from rising in the subsequent charging/discharging sessions as well, whereby a favorable charge/discharge efficiency and a favorable rate characteristic can be obtained over a long period. For attaining a state where the additive compound is supported, adsorbed, or combined at the active points on the active material surface of the anode 10 beforehand, the method of manufacturing a lithium-ion secondary battery in accordance with the present invention may further carry out a charging step of charging the battery obtained by way of the above-mentioned electrolytic solution making step, electrode insertion step, and liquid injection step.

Though a preferred embodiment of the present invention has been explained in detail in the foregoing, the present invention is not limited to the above-mentioned embodiment. For example, the seal part of the lithium-ion secondary battery 1 may be folded in the explanation of the embodiment, so as to attain a more compact structure. Though the above-mentioned embodiment relates to the lithium-ion secondary battery 1 equipped with one each of the anode 10 and cathode 20, they may be provided two or more each while inserting one separator 40 between each pair of the anode 10 and cathode 20.

Another preferred embodiment of the lithium-ion secondary battery in accordance with the present invention will now be explained.

Figure 10:
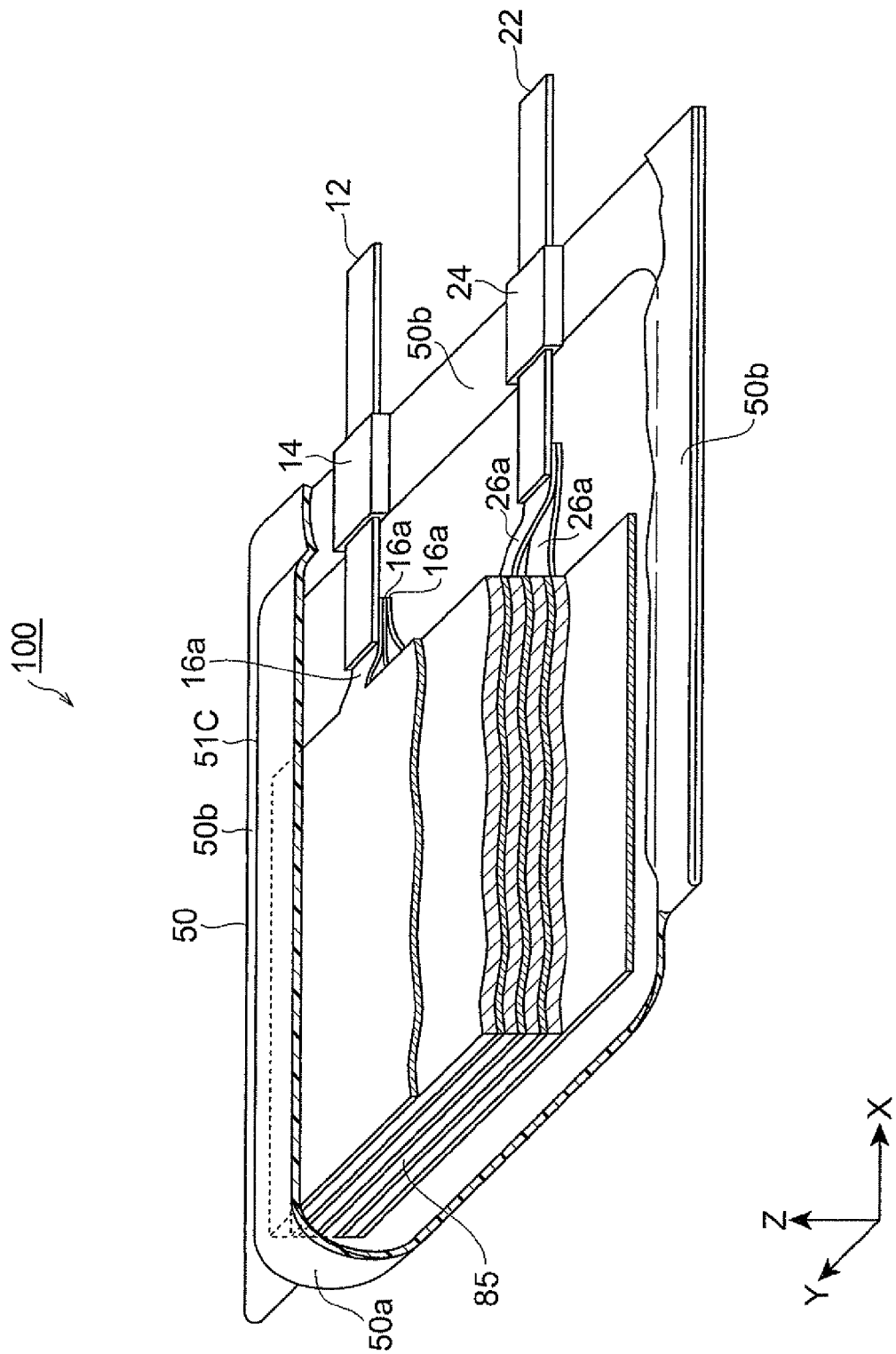
FIG. 10 is a partly broken perspective view showing another preferred embodiment of the lithium-ion secondary battery in accordance with the present invention.
Figure 11:
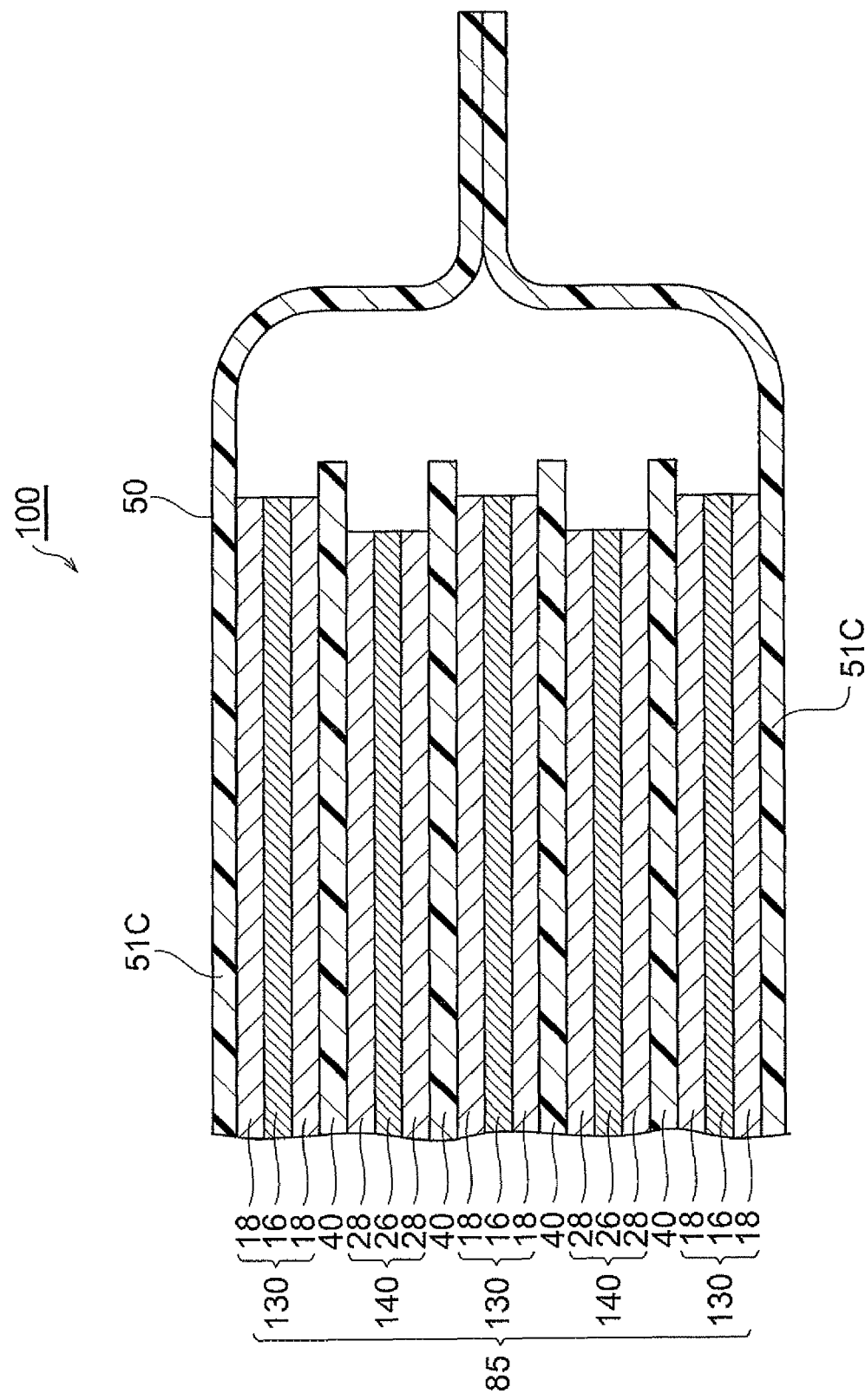
FIG. 11 is a schematic sectional view of the lithium-ion secondary battery taken along the YZ plane of FIG. 10.

FIG. 10 is a partly broken perspective view showing a lithium-ion secondary battery 100 in accordance with another preferred embodiment of the present invention. FIG. 11 is a sectional view of the lithium-ion secondary battery taken along the YZ plane of FIG. 10. As shown in FIGS. 10 and 11, the lithium-ion secondary battery 100 in accordance with this embodiment is constituted by a multilayer structure 85, a case (outer case) 50 containing the multilayer structure 85 in a sealed state, and an anode lead 12 and a cathode lead 22 which are used for connecting the multilayer structure 85 to the outside of the case 50.

As shown in FIG. 11, the multilayer structure 85 is formed by laminating a three-layer anode (negative electrode) 130, a separator 40, a three-layer cathode (positive electrode) 140, a separator 40, a three-layer anode (negative electrode) 130, a separator 40, a three-layer cathode (positive electrode) 140, a separator 40, and a three-layer anode (negative electrode) 130 in order from the upper side.

The three-layer anode 130 has a current collector (anode current collector) 16 and two anode active material containing layers 18 formed on respective surfaces of the current collector 16. The three-layer anodes 130 are laminated such that the anode active material containing layers 18 come into contact with their corresponding separators 40.

The three-layer cathode 140 has a current collector (cathode current collector) 26 and two cathode active material containing layers 28 formed on respective surfaces of the current collector 26. The three-layer cathodes 140 are laminated such that the cathode active material containing layers 28 come into contact with their corresponding separators 40.

The electrolytic solution (not depicted) fills the inner space of the case 50, while being partly contained within the anode active material containing layers 18, cathode active material containing layers 28, and separators 40.

As shown in FIG. 10, respective one ends of the current collectors 16, 26 extend outward so as to form lips 16a, 26a. Also, as shown in FIG. 10, the anode lead 12 and cathode lead 22 project from the inside to the outside of the case 50 through the seal part 50b. The end part of the lead 12 within the case 50 is welded to each of the lips 16a of the three current collectors 16, whereby the lead 12 is electrically connected to each of the anode active material containing layers 18 through the current collectors 16. On the other hand, the end part of the lead 22 within the case 50 is welded to each of the lips 26a of the two current collectors 26, whereby the lead 22 is electrically connected to each of the cathode active material containing layers 28 through the current collectors 26.

As shown in FIG. 10, the parts of the leads 12, 22 held by the seal part 50b of the case 50 are covered with insulators 14, 24 made of a resin or the like, respectively, so as to enhance sealability. The leads 12, 22 are separated from each other in a direction orthogonal to the laminating direction of the multilayer structure 85.

As shown in FIG. 10, the case 50 is formed by folding a rectangular flexible sheet 51C into two parts at a substantially center part in its longitudinal direction, and holds the multilayer structure 85 from both sides in the laminating direction (vertical direction). In the end parts of the sheet 51C folded into two parts, three side seal parts 50b excluding the turned part 50a are bonded by heat sealing or with an adhesive, whereby the multilayer structure 85 is sealed therewithin. The case 50 is also bonded to the insulators 14, 24 at the seal part 50b, thereby sealing the leads 12, 22.

For the current collectors 16, 26, active material containing layers 18, 28, separators 40, electrolytic solution, leads 12, 22, insulators 14, 24, and case 50 of the lithium-ion secondary battery 100 shown in FIGS. 10 and 11, constituent materials similar to those in the lithium-ion secondary battery 1 shown in FIGS. 1 to 9 are used.

When the multilayer structure 85 has a multilayer structure of the three-layer anode (negative electrode) 130/separator/ three-layer cathode (positive electrode) 140/separator/three-layer anode (negative electrode) 130, i.e., when both of the outermost layers are negative electrodes, it tends to be easier to restrain heat from being generated during nail penetration tests. This effect will be obtained if only the multilayer structure 85 has a multilayer structure of negative electrode/separator/positive electrode/separator/negative electrode)n, where n is an integer of 1 or greater.

The multilayer structure 85 in the lithium-ion secondary battery 100 shown in FIGS. 10 and 11 has four sets of secondary battery elements, i.e., anode/separator/cathode combinations, each acting as a single cell, but may have more than four sets or less than three sets as well Though the above-mentioned embodiment exemplifies a mode in which each of the two outermost layers is the three-layer anode 130 as a preferred mode, one or both of the outermost layers may be a two-layer anode.

Though the above-mentioned embodiment exemplifies a mode in which both of the two outermost layers are anodes (negative electrodes) as a preferred mode, the present invention can also be carried out when the two outermost layers are a cathode (positive electrode) and an anode (negative electrode) or both cathodes (positive electrodes).

Figure 12:
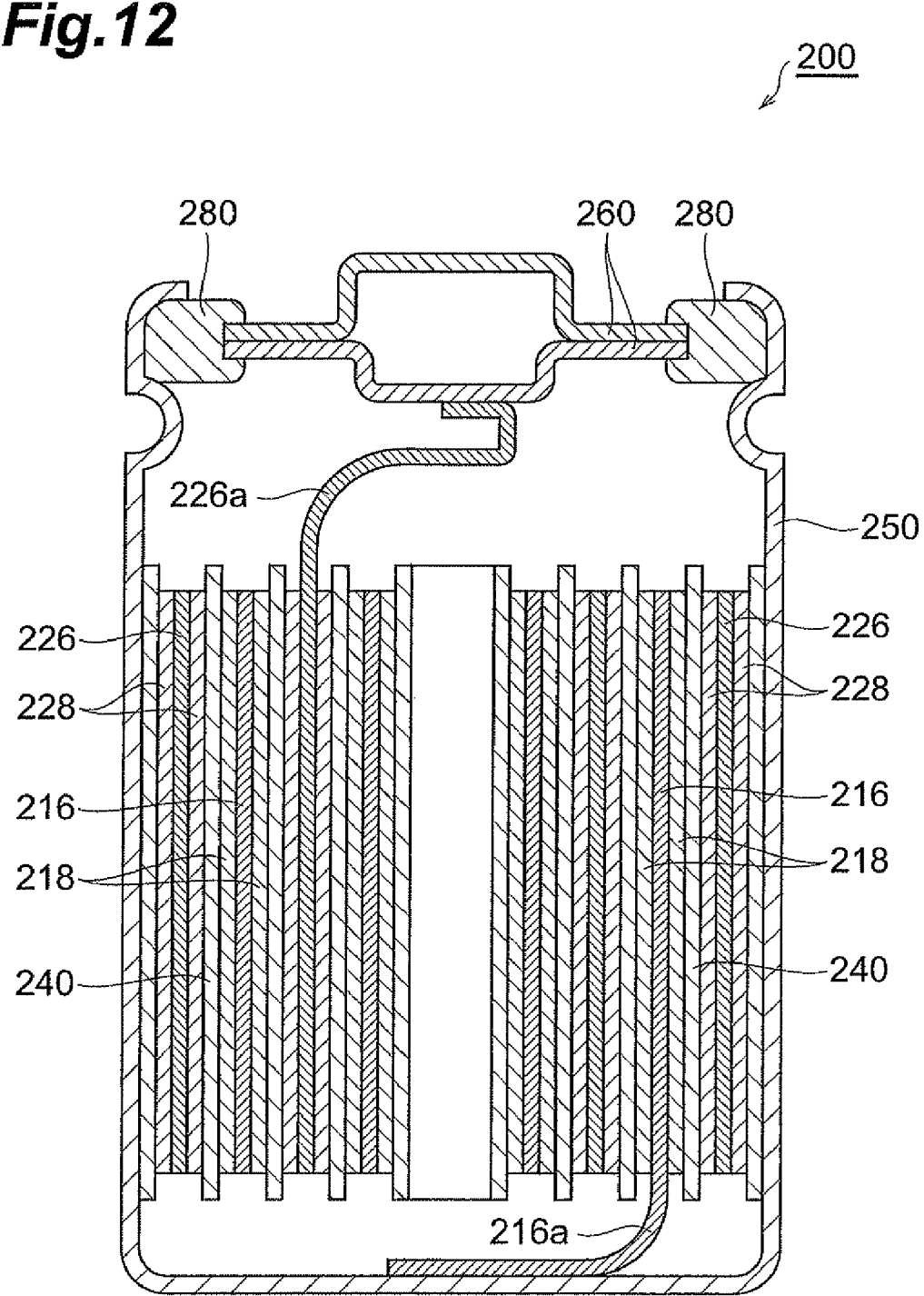
FIG. 12 is a schematic sectional view showing still another preferred embodiment of the lithium-ion secondary battery in accordance with the present invention.

FIG. 12 is a schematic sectional view showing a lithium-ion secondary battery 200 in accordance with still another preferred embodiment of the present invention. The lithium-ion secondary battery 200 shown in FIG. 12 is a so-called cylindrical battery and has a structure in which an anode and a cathode spirally oppose each other.

In the lithium-ion secondary battery 200, the anode constituted by a current collector (anode current collector) 216 and two anode active material containing layers 218 formed on respective surfaces of the current collector 216 and the cathode constituted by a current collector (cathode current collector) 226 and two cathode active material containing layers 228 formed on respective surfaces of the current collector 226 are wound while opposing each other through a separator 240 and contained in a conductive outer can 250.

An electrolytic solution (not depicted) fills the inner space of the case 250, while being partly contained within the anode active material containing layers 218, cathode active material containing layers 228, and separator 240.

A conductive positive electrode cap 260 is fitted into the opening of the outer can 250 together with a gasket 280, so as to seal the opening hermetically. Here, the gasket 280 secures insulation between the outer can 250 and positive electrode cap 260. Thus, the outer can 250, positive electrode cap 260, and gasket 280 form the outer case of the lithium-ion secondary battery 200.

A negative electrode tab 216a provided with the current collector 216 and a positive electrode tab 226a provided with the current collector 226 are electrically connected to the outer can 250 and the positive electrode cap 260, respectively.

For the current collectors 216, 226, active material containing layers 218, 228, separator 240, and electrolytic solution in the lithium-ion secondary battery 200, constituent materials similar to those in the lithium-ion secondary battery 1 shown in FIGS. 1 to 9 are used.

As the outer can 250, positive electrode cap 260, and gasket 280, those used in known cylindrical batteries can be employed without any restrictions in particular. Examples of the material for the outer can 250 include iron, stainless steel, and nickel. Examples of the material for the positive electrode cap 260 include iron, stainless steel, and aluminum. Examples of the material for the gasket 280 include polypropylene and polyethylene.

EXAMPLES

The present invention will now be explained more specifically with reference to examples and comparative examples, but will not be restricted to the following examples.

Example 1

Making of Anode

A mixture of 92 parts by mass of natural graphite (product name: OMAC manufactured by Osaka Gas Chemicals Co. Ltd.) and 8 parts by mass of polyvinylidene fluoride (PVDF) was dissolved into N-methylpyrrolidone (NWP), so as to yield a slurry-like coating liquid for forming an anode active material containing layer. This coating liquid was applied to a copper foil by doctor blading and then dried, so as to form an anode active material containing layer. This yielded an anode in which a current collector having a thickness of 15 μm and an active material containing layer having a thickness of 60 μm were laminated.

Making of Cathode

A mixture of 92 parts by mass of $LiNi_{1/3}MN_{1/3}Co_{1/3}O_2$, 3 parts by mass of acetylene black, and 5 parts by mass of polyvinylidene fluoride (PVdF) was dissolved into N-methylpyrrolidone (NMP), so as to yield a slurry-like coating liquid for forming a cathode active material containing layer. This coating liquid was applied to an Al foil by doctor blading and then dried, so as to form a cathode active material containing layer. This yielded a cathode in which a current collector having a thickness of 15 μm and an active material containing layer having a thickness of 60 μm were laminated.

Making of Electrolytic Solution

A mixed solvent was obtained by mixing 20 parts by volume of propylene carbonate (PC), 10 parts by volume of ethylene carbonate (EC), and 70 parts by volume of diethyl carbonate. Lithium hexafluorophosphate ($LiPF_6$) was dissolved into this mixed solvent so as to yield a concentration of 1.5 mol·dm$^{-3}$. Further, 1,2-epoxydodecane was added to the resulting solution so as to attain a concentration of 0.1 mass %, thereby yielding an electrolytic solution.

Making of Lithium-Ion Secondary Battery

The anode and cathode were punched out into sizes of 17 mm×34.5 mm and 17 mm×34 mm, respectively, and the anode and cathode were laminated with a separator made of polyethylene interposed therebetween, so as to form a battery matrix. Thus obtained battery matrix was put into an aluminum laminate film, the electrolytic solution was injected therein, and then the film was sealed in vacuum. This yielded a lithium-ion secondary battery.

Examples 2 to 8

Lithium-ion secondary batteries of Examples 2 to 8 were made as in Example 1 except that 1,2-epoxydodecane was added so as to attain concentrations of 0.3 mass % (Example 2), 0.5 mass % (Example 3), 1 mass % (Example 4), 2 mass % (Example 5), 3 mass % (Example 6), 5 mass % (Example 7), and 7 mass % (Example 8) at the time of preparing the electrolytic solution.

Example 9

The lithium-ion secondary battery of Example 9 was made as in Example 1 except that 1,2-epoxypentadecane was added in place of 1,2-epoxydodecane so as to yield a concentration of 2 mass % at the time of preparing the electrolytic solution.

Example 10

The lithium-ion secondary battery of Example 10 was made as in Example 1 except that 1,2-epoxyoctadecane was added in place of 1,2-epoxydodecane so as to yield a concentration of 2 mass % at the time of preparing the electrolytic solution.

Comparative Example 1

The lithium-ion secondary battery of Comparative Example 1 was made as in Example 1 except that 1,2-epoxydodecane was not added at the time of preparing the electrolytic solution.

Comparative Example 2

The lithium-ion secondary battery of Comparative Example 2 was made as in Example 1 except that 1,2-epoxypentane was added in place of 1,2-epoxydodecane so as to yield a concentration of 2 mass % at the time of preparing the electrolytic solution.

Comparative Example 3

The lithium-ion secondary battery of Comparative Example 3 was made as in Example 1 except that 1,2-epoxydecane was added in place of 1,2-epoxydodecane so as to yield a concentration of 2 mass % at the time of preparing the electrolytic solution.

Measurement of Initial Charge/Discharge Efficiency

Each of the lithium-ion secondary batteries obtained in the foregoing examples and comparative examples was subjected to a charging/discharging test at 25° C. with a charge stop voltage of 4.2 V and a discharge stop voltage of 3 V at a constant current of 10 mA. The charge/discharge efficiency in the first cycle was measured. Table 1 shows the results. The charge/discharge efficiency was determined by the following expression:

Charge/discharge efficiency (%)=[(discharged capacity)/(charged capacity)]×100.

Measurement of Rate Characteristic

Figure 13:
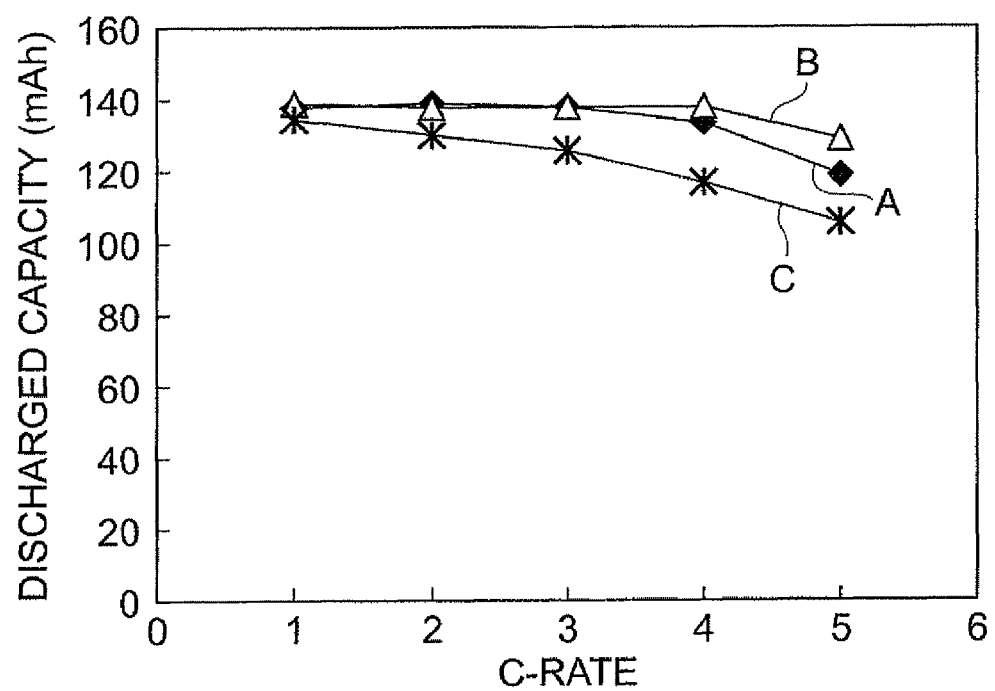
FIG. 13 is a graph showing rate characteristics of lithium-ion secondary batteries obtained by examples and a comparative example.

For each of the lithium-ion secondary batteries obtained in Examples 5 and 9 and Comparative Example 1, the discharged capacity from 1 C (a current value at which the constant-current discharging at 25° C. completed in 1 hr) to 5 C (a current value at which the constant-current discharging at 25° C. completed in 0.2 hr) was measured. FIG. 13 shows the results. In the chart, A, B, and C show the results of measurement of Examples 5 and 9 and Comparative Example 1, respectively.

For each of the lithium-ion secondary batteries obtained in Examples and Comparative Examples, the ratio of the discharged capacity at 5 C to the discharged capacity at 1 C taken as 100% was determined as a high rate characteristic. Table 1 shows the results.

Measurement of Cycle Characteristic

Each of the lithium-ion secondary batteries obtained in Examples and Comparative Examples was charged at a rate of 1 C by CCCV charging at 4.2 V. Thereafter, constant-current discharging was performed at a rate of 1 C to 2.5 V. Taking this set of charging and discharging as 1 cycle, 500 cycles were performed, and the ratio (%) of the discharged capacity at the 500th cycle to the discharged capacity at the first cycle was determined as a cycle characteristic. Table 1 shows the results.

TABLE 1

| | Additive compound | Initial charge/discharge efficiency [%] | High rate characteristic (5C/1C) [%] | Cycle characteristic [%] |
|---|---|---|---|---|
| Example 1 | 0.1 mass % 1,2-epoxydodecane (n = 9) | 63.9 | 79.3 | 64 |
| Example 2 | 0.3 mass % 1,2-epoxydodecane (n = 9) | 70.0 | 81.1 | 67 |
| Example 3 | 0.5 mass % 1,2-epoxydodecane (n = 9) | 70.1 | 82.3 | 70 |
| Example 4 | 1 mass % 1,2-epoxydodecane (n = 9) | 72.7 | 85.5 | 74 |
| Example 5 | 2 mass % 1,2-epoxydodecane (n = 9) | 73.9 | 92.5 | 78 |
| Example 6 | 3 mass % 1,2-epoxydodecane (n = 9) | 73.7 | 91.6 | 73 |
| Example 7 | 5 mass % 1,2-epoxydodecane (n = 9) | 69.0 | 79.8 | 64 |
| Example 8 | 7 mass % 1,2-epoxydodecane (n = 9) | 69.1 | 78.9 | 63 |
| Example 9 | 2 mass % 1,2-epoxypentadecane (n = 12) | 70.0 | 89.8 | 75 |
| Example 10 | 2 mass % 1,2-epoxyoctadecane (n = 15) | 69.5 | 85.6 | 72 |
| Comparative Example 1 | no addition | 63.2 | 77.9 | 48 |
| Comparative Example 2 | 2 mass % 1,2-epoxypentane (n = 2) | 64.1 | 75.6 | 59 |
| Comparative Example 3 | 2 mass % 1,2-epoxydecane (n = 7) | 64.8 | 77.3 | 52 |

Example 11

Making of Anode

A silicon oxide powder was obtained by pulverizing silicon oxide (manufactured by Aldrich Co.) in a ball mill. A mixture of 83 parts by mass of the silicon oxide powder, 15 parts by mass of polyimide resin, and 2 parts by mass of acetylene black was dissolved into N-methylpyrrolidone (AMP), so as to yield a slurry-like coating liquid for forming an anode active material containing layer. This coating liquid was applied to a copper foil by doctor blading and then dried, so as to form an anode active material containing layer. This yielded an anode in which a current collector having a thickness of 15 μm and an active material containing layer having a thickness of 18 μm were laminated.

Making of Cathode

A cathode was obtained as in Example 1.

Making of Electrolytic Solution

A mixed solvent was obtained by mixing 30 parts by volume of ethylene carbonate (EC) and 70 parts by volume of diethyl carbonate. Lithium hexafluorophosphate ($LiPF_6$) was dissolved into this mixed solvent so as to yield a concentration of 1.5 mol·$dm^{-3}$. Further, 1,2-epoxydodecane was added to the resulting solution so as to attain a concentration of 2 mass %, thereby yielding an electrolytic solution.

Making of Lithium-Ion Secondary Battery

The anode and cathode were punched out into sizes of 17 mm×34.5 mm and 17 mm×34 mm, respectively, and the anode and cathode were laminated with a separator made of polyethylene interposed therebetween, so as to form a battery matrix. Thus obtained battery matrix was put into an aluminum laminate film, the electrolytic solution was injected therein, and then the film was sealed in vacuum. This yielded a lithium-ion secondary battery.

Example 12

The lithium-ion secondary battery of Example 12 was made as in Example 11 except that 1,2-epoxydodecane was added so as to yield a concentration of 1 mass % at the time of preparing the electrolytic solution.

Example 13

The lithium-ion secondary battery of Example 13 was made as in Example 11 except that 1,2-epoxypentadecane was added in place of 1,2-epoxydodecane so as to yield a concentration of 2 mass % at the time of preparing the electrolytic solution.

Example 14

The lithium-ion secondary battery of Example 14 was made as in Example 11 except that 1,2-epoxyoctadecane was added in place of 1,2-epoxydodecane so as to yield a concentration of 2 mass % at the time of preparing the electrolytic solution.

Comparative Example 4

The lithium-ion secondary battery of Comparative Example 4 was made as in Example 11 except that 1,2-epoxydodecane was not added at the time of preparing the electrolytic solution.

Measurement of Initial Charge/Discharge Efficiency

The initial charge/discharge efficiency of each of the lithium-ion secondary batteries obtained in Examples 11 to 14 and Comparative Example 4 was measured by the same method as that of the above-mentioned "Measurement of Initial Charge/Discharge Efficiency". Table 2 shows the results.

Measurement of Rate Characteristic

The high rate characteristic of each of the lithium-ion secondary batteries obtained in Examples 11 to 14 and Comparative Example 4 was measured by the same method as that of the above-mentioned "Measurement of Rate Characteristic". Table 2 shows the results.

Measurement of Cycle Characteristic

The cycle characteristic of each of the lithium-ion secondary batteries obtained in Examples 11 to 14 and Comparative Example 4 was measured by the same method as that of the above-mentioned "Measurement of Cycle Characteristic". Table 2 shows the results.

TABLE 2

|  | Additive compound | Initial charge/discharge efficiency [%] | High rate characteristic (5C/1C)[%] | Cycle characteristic [%] |
|---|---|---|---|---|
| Example 11 | 2 mass % 1,2-epoxydodecane (n = 9) | 66.8 | 85.6 | 70 |
| Example 12 | 1 mass % 1,2-epoxydodecane (n = 9) | 65.2 | 84.1 | 71 |
| Example 13 | 2 mass % 1,2-epoxypentadecane (n = 12) | 64.5 | 83.2 | 72 |
| Example 14 | 2 mass % 1,2-epoxyoctadecane (n = 15) | 64.2 | 82.2 | 70 |
| Comparative Example 4 | no addition | 61.5 | 77.2 | 58 |

where n is an integer of 9 to 17.

3. A method of manufacturing a lithium-ion secondary battery according to claim 1, wherein the compound is added by 0.3 to 3.0 mass % with respect to the total amount of the electrolytic solution after adding the compound.

4. A method of manufacturing a lithium-ion secondary battery according to claim 1, wherein the anode contains at least one of graphite, an Si-containing compound, and an Sn-containing compound as an active material.

5. An electrolytic solution containing:
    an organic solvent selected from the group consisting of propylene carbonate, ethylene carbonate, and diethyl carbonate;
    an electrolytic salt; and
    a compound having an alkyl group with a carbon number of 10 to 18, and an epoxy, vinyl, or silanol group at a terminal.

6. An electrolytic solution according to claim 5, wherein the compound is represented by the following general formula (1):

where n is an integer of 9 to 17.

7. An electrolytic solution according to claim 5, wherein the compound is contained by 0.3 to 3.0 mass % with respect to the total amount of the electrolytic solution.

8. A lithium-ion secondary battery comprising an anode, a cathode, and an electrolytic solution;
    wherein the electrolytic solution is the electrolytic solution according to claim 5.

9. A lithium-ion secondary battery according to claim 8, wherein the anode contains at least one of graphite, an Si-containing compound, and an Sn-containing compound as an active material.

What is claimed is:

1. A method of manufacturing a lithium-ion secondary battery, the method including:
    an electrolytic solution making step of making an electrolytic solution by mixing at least an organic solvent and an electrolytic salt together;
    an electrode insertion step of inserting an anode and a cathode into an outer case; and
    a liquid injection step of injecting the electrolytic solution into the outer case;
    wherein the electrolytic solution making step or the liquid injection step adds a compound having an alkyl group with a carbon number of 10 to 18, and an epoxy, vinyl, or silanol group at a terminal to the electrolytic solution, and
    the organic solvent includes at least one selected from the group consisting of propylene carbonate, ethylene carbonate, and diethyl carbonate.

2. A method of manufacturing a lithium-ion secondary battery according to claim 1, wherein the compound is represented by the following general formula (1):

* * * * *